UNITED STATES PATENT OFFICE 2,676,982

FLUORESCENT AGENTS

Harlan Benjamin Freyermuth, William Harris Libby, and William W. Williams, Easton, Pa., assignors to General Aniline & Film Corporation, New York, N. Y., a corporation of Delaware No Drawing. Application June 8, 1951, Serial No. 230,682

3 Claims. (Cl. 260—506)

This invention relates to novel fluorescent agents of the following general formula

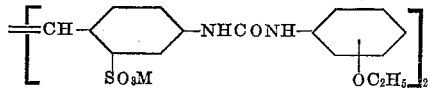

in which M represents hydrogen or a cation usually alkali metal (sodium or potassium) or alkaline earth metal (calcium, barium, etc.) or ammonium or alkylolamine.

These compounds are readily prepared by the condensation of one molecular proportion of 4,4'-diamino-2,2'-stilbenedisulfonic acid with four molecular proportions of 2-ethoxyphenyl isocyanate or 4-ethoxyphenyl isocyanate.

These products are useful when incorporated into paper pulp to improve the whiteness of the finished sheet. When applied to fabrics, particularly of wool, silk or protein fibers in general, by methods well known in the art, the whiteness of these fabrics is remarkably improved. If small quantities of these materials are added to soaps or other detergents, fabrics which are washed using these formulations will be much whiter in the case of whites and much brighter in the case of colors than fabrics which are washed using ordinary soaps or detergents.

The preparation of the above mentioned materials is illustrated in the following examples in which the parts are by weight:

Example 1

A mixture of 928 parts of water, 42.1 parts of 4,4'-diamino-2,2'-stilbenedisulfonic acid and a solution of 8.7 parts of sodium hydroxide in 29 parts of water is heated to 40° C. Sixty-five and three-tenths parts of 2-ethoxyphenyl isocyanate is added dropwise and the mixture heated at 40–45° C. for three hours, allowed to cool and stirred at room temperature overnight. The product is isolated in the usual manner. It corresponds to the formula:

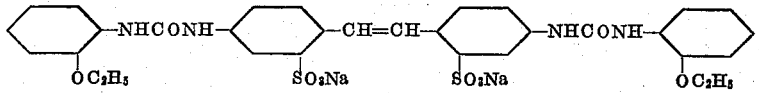

Example 2

The procedure of Example 1 was repeated except that 65.3 parts of 4-ethoxyphenyl isocyanate was employed in place of the 65.3 parts of 2-ethoxyphenyl isocyanate. The product obtained corresponded to the formula

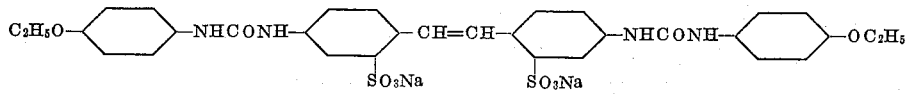

Both of the above products were substantially similar in properties and were tested as fluorescent brightening agents by incorporating a minor amount thereof in soap. It was found that fabrics of cellulose, wool, silk and nylon, washed with the resulting mixtures were, in the cases of white fabrics, much whiter in appearance, and the colored materials, brighter, than the same fabrics washed with ordinary soap containing no fluorescent agents.

It was also found that the above products when applied to fabrics of wool, silk and cellulose, by methods well known in the art, i. e., from mildly alkaline baths, substantially whitened or brightened materials and were distinctly superior in this respect to related compounds such as 4,4'-bis - (2,4-dimethoxyphenylureido)-2,2'-stilbene-disulfonic acid sodium salt which imparted a definite yellow to the treated fabrics.

It will be apparent that in the foregoing examples the novel products of the present invention were obtained in the form of their sodium salts. However, the potassium salts have substantially similar properties and it will be apparent that the potassium salts will be obtained by using potassium hydroxide in place of sodium hydroxide as the alkaline agent for the condensations in the synthesis of these materials. The free acids may be obtained by acidification of the sodium or potassium salt while other salts such as the ammonium or alkylol amine salts may be obtained by neutralization of the free acids. Where spirit soluble products are desired, for instance, in brightening of lacquers etc. the higher alkyl or cycloalkylamines salts of the free acids such as the cyclohexylamine salts of the free acids may be produced by methods known in the art. The alkaline earth metal salts such as the barium and calcium salts which may be obtained from the free acid or by double decomposition of the sodium or potassium salts have been found to be useful for the brightening of photographic prints etc.

The novel fluorescent agents of the present invention fluoresce under ultra-violet light with a bluish fluorescence, and since they are substantive to cellulosic materials, are particularly valuable for incorporation into soaps and synthetic detergents such as alkyl aryl sulfonates, higher fatty acid methyl taurides, nonionic detergents such as the poylglycol ethers of alkyl phenols or of partial higher fatty acid esters of mannitol or sorbitol. The fabrics washed with formulations of detergents containing these fluorescent agents appear much whiter in the case of whites and much brighter in the case of colors than fabrics which are washed with ordinary soaps or detergents. These fluorescent agents may also be applied to fabrics by separate treating baths and similar methods and procedures well known in the art. They are also useful when incorporated into paper or other wrapping materials, particularly cellulosic wrapping material to improve the whiteness of such material, as well as to protect the contents from the action of ultraviolet light. They may also be incorporated in discharge pastes whereby the whites obtained upon discharge are decidedly whiter than those discharges made in the absence of such materials. They may also be used to bleach fabrics and in such cases the amount of bleach necessary is materially reduced and one or more steps of the normal bleaching operations may be eliminated.

We claim:

1. Fluorescent agents selected from the group consisting of compounds of the formula

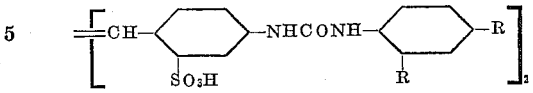

wherein one R represents —OC$_2$H$_5$ and the other R represents hydrogen and the salts of such compounds.

2. Fluorescent agents selected from the group consisting of the compound of the formula

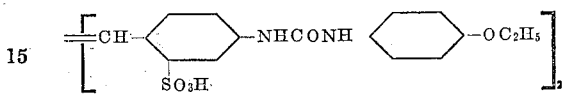

and the salts of said compound.

3. Fluorescent agents selected from the group consisting of the compound of the formula

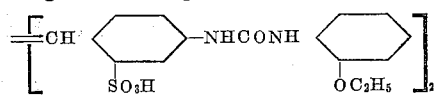

and the salts of said compound.

References Cited in the file of this patent

UNITED STATES PATENTS

| Number | Name | Date |
|---|---|---|
| 2,468,431 | Eberhart et al. | Apr. 26, 1949 |
| 2,521,665 | Hausermann | Sept. 5, 1950 |
| 2,527,427 | Keller et al. | Oct. 24, 1950 |
| 2,563,354 | Munro | Aug. 7, 1951 |
| 2,581,057 | Wirth | Jan. 1, 1952 |
| 2,581,059 | Witte | Jan. 1, 1952 |
| 2,589,519 | Hoch et al. | Mar. 18, 1952 |

OTHER REFERENCES

Conant, "The Chemistry of Organic Chemistry" (1939), pp. 554–5.

Bonnet, L'Industrie Textile, vol. 64, pp. 154–5 (1947).